(12) United States Patent
Chen

(10) Patent No.: US 11,122,896 B1
(45) Date of Patent: Sep. 21, 2021

(54) SCREW-FREE DRAWER STRUCTURE

(71) Applicant: House & Home Co, Ltd., Fujian (CN)

(72) Inventor: Xusheng Chen, Xiamen (CN)

(73) Assignee: HOUSE & HOME CO, LTD., Fujian (CN)

( * ) Notice: Subject to any disclaimer, the term of this patent is extended or adjusted under 35 U.S.C. 154(b) by 0 days.

(21) Appl. No.: 17/024,653

(22) Filed: Sep. 17, 2020

(51) Int. Cl.
*A47B 88/90* (2017.01)
*F16B 5/06* (2006.01)
*A47B 88/95* (2017.01)
*A47B 88/41* (2017.01)

(52) U.S. Cl.
CPC .......... *A47B 88/9414* (2017.01); *A47B 88/41* (2017.01); *A47B 88/95* (2017.01); *F16B 5/0614* (2013.01); *F16B 2005/0678* (2013.01)

(58) Field of Classification Search
CPC ..... A47B 88/41; A47B 88/0411; A47B 88/90; A47B 88/906; A47B 88/0003; A47B 88/913; A47B 88/941; A47B 88/0014; A47B 88/9412; A47B 88/0018; A47B 88/9414; A47B 88/0022; A47B 88/9416; A47B 88/0025; A47B 88/9418; A47B 88/0029; A47B 88/95; A47B 88/0051; A47B 2088/004; A47B 2088/951; A47B 2088/0059; A47B 2088/953; A47B 2088/0066; A47B 2210/01; A47B 2210/09; F16B 5/0614; F16B 2005/0678
See application file for complete search history.

(56) References Cited

U.S. PATENT DOCUMENTS

| | | | | |
|---|---|---|---|---|
| 3,752,553 | A * | 8/1973 | Bildahl | A47B 88/95 312/265.1 |
| 4,191,439 | A * | 3/1980 | Cohen | A47B 88/941 312/111 |
| 6,056,380 | A * | 5/2000 | Nien | A47B 88/9414 312/330.1 |
| 6,390,359 | B1 * | 5/2002 | Lin | A47B 88/975 229/198 |
| 9,089,964 | B2 * | 7/2015 | Cheng | B25H 3/02 |
| 9,757,489 | B2 * | 9/2017 | Allen | A61L 2/26 |
| 10,197,081 | B2 * | 2/2019 | Koelling | A47B 47/025 |
| 10,362,872 | B1 * | 7/2019 | Chen | A47B 31/00 |
| 2020/0146447 | A1 * | 5/2020 | Brendel | F16B 12/22 |

FOREIGN PATENT DOCUMENTS

| | | | | |
|---|---|---|---|---|
| DE | 8021658 | U1 * | 11/1980 | A47B 88/95 |
| DE | 9115465 | U1 * | 2/1992 | A47B 88/941 |
| DE | 202010007427 | U1 * | 9/2011 | A47B 88/95 |
| GB | 2052956 | A * | 2/1981 | A47B 88/9412 |
| JP | 2001186946 | A * | 7/2001 | A47B 88/41 |

\* cited by examiner

*Primary Examiner* — Andrew M Roersma
(74) *Attorney, Agent, or Firm* — Leong C. Lei

(57) ABSTRACT

A screw-free drawer structure includes a front board, a rear board, two side boards, and a bottom board. The side boards are foldably connected to opposite sides of the bottom board. An upper end of a junction of each side board and the rear board is detachably connected through an elastic fastener that is in snap-fit with a fastener hole. A junction of each side board and the front board is detachably connected through an elastic expansion member that is elastically expanded to be in snap-fit with an engaging hole. Therefore, the screw-free assembly of the drawer structure is realized, and the assembly of the drawer structure is convenient and easy.

9 Claims, 8 Drawing Sheets

SCREW-FREE DRAWER STRUCTURE

BACKGROUND OF THE INVENTION

1. Field of the Invention

The present invention relates to furniture, and more particularly to a screw-free drawer structure.

2. Description of the Prior Art

Common furniture, such as wardrobes, lockers, desks, etc., is equipped with drawers. A conventional drawer usually includes a front board, a rear board, a bottom board, and two side boards. The front board is connected to the side boards and the bottom board with screws one by one. The rear board is connected to the side boards and the bottom board with screws one by one. The conventional drawer has the defect of inconvenient assembly.

Accordingly, the inventor of the present invention has devoted himself based on his many years of practical experiences to solve these problems.

SUMMARY OF THE INVENTION

The primary object of the present invention is to provide a screw-free drawer structure that can be assembled easily.

In order to achieve the above object, the present invention adopts the following solutions.

A screw-free drawer structure comprises a front board, a rear board, two side boards, and a bottom board. The rear board, the side boards and the bottom board are integrally formed. The rear board is foldably connected to a rear edge of the bottom board. The side boards are foldably connected to opposite sides of the bottom board. The rear board is disposed between the two side boards. An upper end of a junction of each side board and the rear board is detachably connected through an elastic fastener that is in snap-fit with a fastener hole. A junction of each side board and the front board is detachably connected through an elastic expansion member that is elastically expanded to be in snap-fit with an engaging hole.

Preferably, the upper end of the junction of each side board and the rear board is insertedly engaged in a first connecting member. The first connecting member is provided with two spaced, tilted elastic fasteners. Two side of the junction of each side board and the rear board are formed with fastener holes. The elastic fasteners are in snap-fit with the corresponding fastener hole, respectively.

Preferably, a junction of the bottom board and the front board is detachably connected through another elastic expansion member that is elastically expanded to be in snap-fit with another engaging hole.

Preferably, an upper portion of one edge of each side board, connected to the front board, is formed with a bendable connecting segment, a front edge of the bottom board, connected to the front board, is formed with another bendable connecting segment, each connecting segment is attached to the front board, each connecting segment is detachably provided with a second connecting member, the elastic expansion member is disposed on the second connecting member, the engaging hole is disposed on the front board, the elastic expansion member is inserted through each connecting segment and the corresponding engaging hole to be elastically expanded and in snap-fit with the corresponding engaging hole.

Preferably, the elastic expansion member includes two spaced elastic bodies. A stop is protruded on an outer side wall of each elastic body. After the elastic bodies pass through the corresponding engaging holes, the elastic bodies elastically expand away from each other, and the stops of the elastic bodies are pressed against inner walls of the engaging holes, respectively. Preferably, casters are provided under the bottom board. Each caster is formed with fixing holes. A third connecting member is detachably connected to the bottom board. The third connecting member is provided with at least one elastic body assembly. The elastic body assembly includes two spaced elastic bodies. A stop is protruded on an outer side wall of each elastic body. After the elastic bodies pass through the corresponding fixing holes, the elastic bodies elastically expand away from each other, and the stops of the elastic bodies are pressed against outer walls of the fixing holes.

Preferably, the at least one elastic body assembly includes two elastic body assemblies.

Preferably, the number of the casters is four. The casters are evenly spaced.

Preferably, each caster includes a support frame and a wheel. The wheel is rotatably connected to a lower end of the support frame. The fixing holes are spaced apart from each other and arranged on a top of the support frame. Opposite sides of the top of the support frame extend outward to form swing-limiting support plates, respectively. The swing-limiting support plates are located between the fixing holes.

Preferably, the front board, the rear board, the side boards and the bottom board are hollow PP boards.

After adopting the above technical solutions, in the present invention, the rear board, the side boards and the bottom board are integrally formed. The rear board is foldably connected to the bottom board, and the side boards are foldably connected to the bottom board. When the present invention is to be assembled, the side boards and the rear board are bent upward relative to the bottom board, and then the upper end of the junction of each side board and the rear board is connected and secured by the elastic fastener to be in snap-fit with the fastener hole. After that, the junction of each side board and the front board is connected and secured by the elastic expansion member to be elastically expanded and in snap-fit with the engaging hole. Therefore, the screw-free assembly of the present invention is realized, and the assembly of the present invention is convenient and easy.

DETAILED DESCRIPTION OF THE PREFERRED EMBODIMENTS

Figure 1:
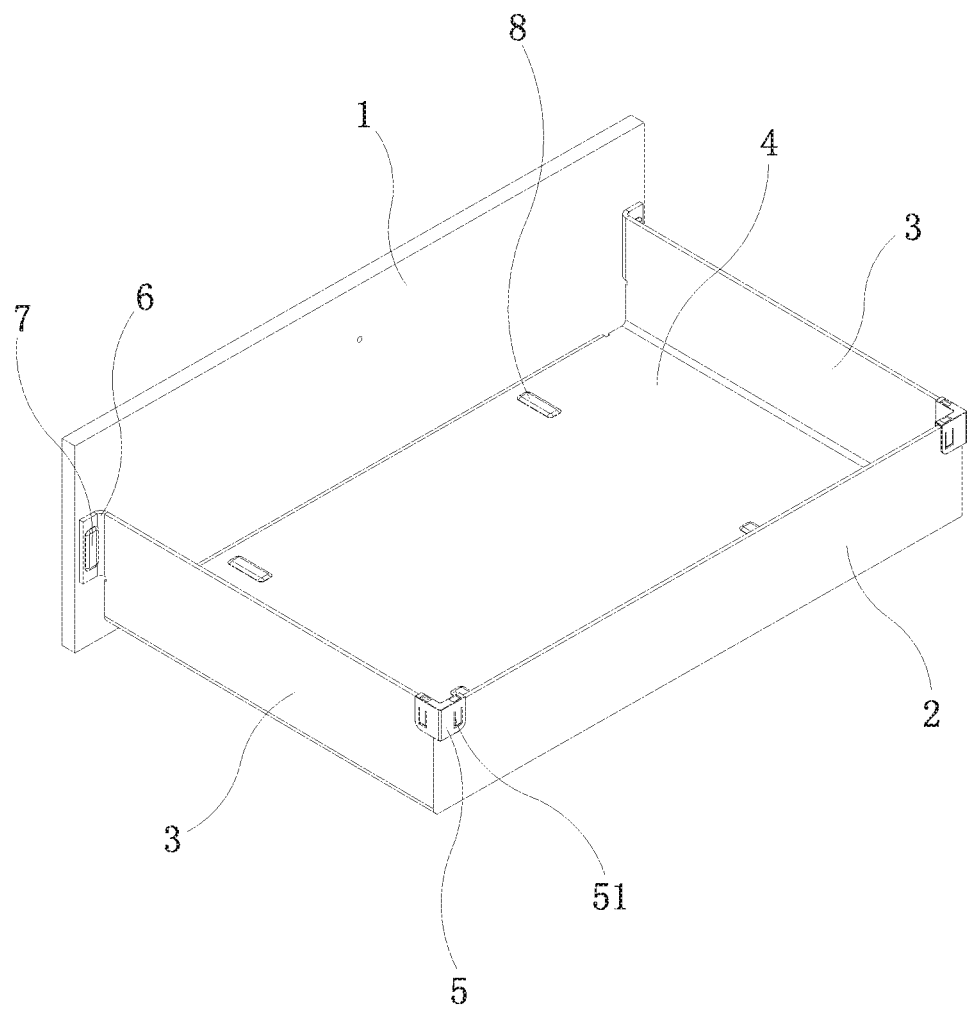
FIG. 1 is a perspective view of the present invention.

Embodiments of the present invention will now be described, by way of example only, with reference to the accompanying drawings.

As shown in FIG. 1 through FIG. 5A, the present invention discloses a screw-free drawer structure. The screw-free drawer structure comprises a front board 1, a rear board 2, two side boards 3, and a bottom board 4. The rear board 2, the side boards 3 and the bottom board 4 are integrally formed. The rear board 2 is foldably connected to a rear edge of the bottom board 4. The side boards 3 are foldably connected to opposite sides of the bottom board 4. The rear board 2 is disposed between the two side boards 3. The upper end of the junction of each side board 3 and the rear board 2 is detachably connected through an elastic fastener 51 that is in snap-fit with a fastener hole 23. The junction of each side board 3 and the front board 1 is detachably connected through an elastic expansion member 71 that is elastically expanded to be in snap-fit with an engaging hole 11.

In the present invention, the rear board 2, the side boards 3 and the bottom board 4 are integrally formed, the rear board 2 is foldably connected to the bottom board 4, and the side boards 3 are foldably connected to the bottom board 4. When the present invention is to be assembled, the side boards 3 and the rear board 2 are bent upward relative to the bottom board 4, and then the upper end of the junction of each side board 3 and the rear board 2 is connected and secured by the elastic fastener 51 to be in snap-fit with the fastener hole 23. After that, the junction of each side board 3 and the front board 1 is connected and secured by the elastic expansion member to be elastically expanded and in snap-fit with the engaging hole 11. Therefore, the screw-free assembly of the present invention is realized, and the assembly of the present invention is convenient and easy.

In order to improve the overall connection strength of the present invention, the junction of the bottom board 4 and the front board 1 may be detachably connected through an elastic expansion member 71 that is elastically expanded to be in snap-fit with an engaging hole 11.

Figure 4:
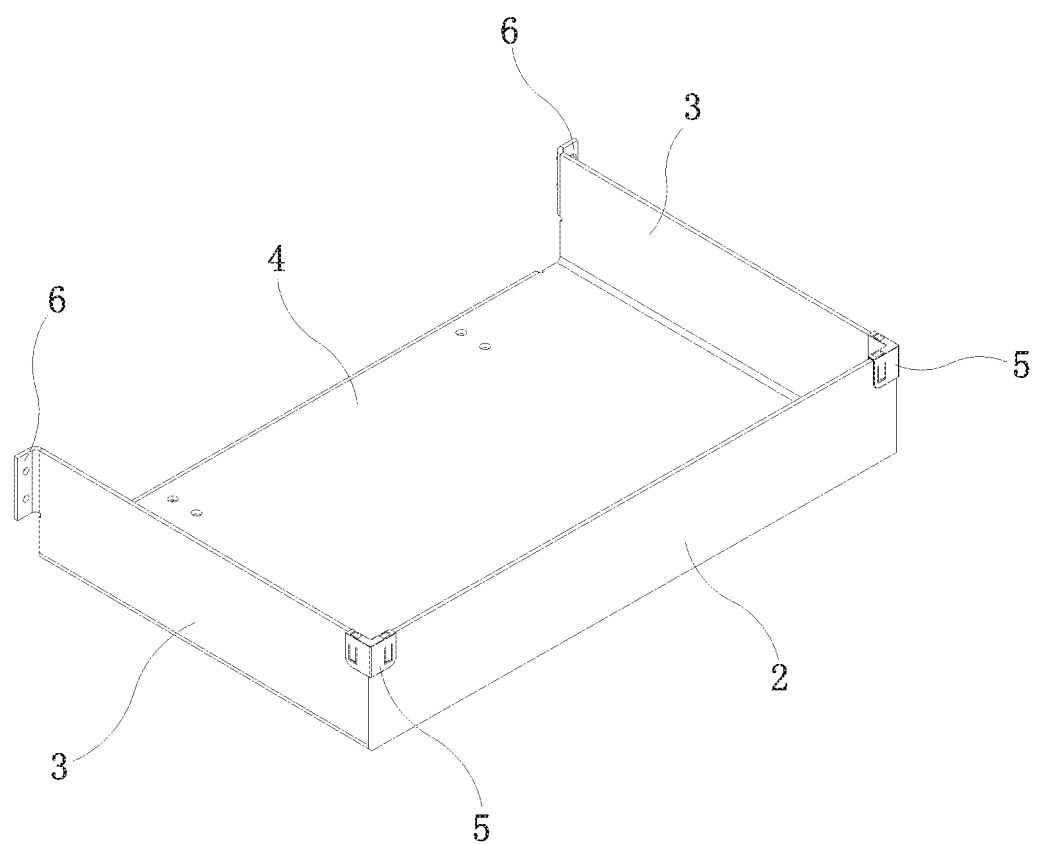
FIG. 4 is a second schematic view of the present invention to be assembled.
Figure 4A:
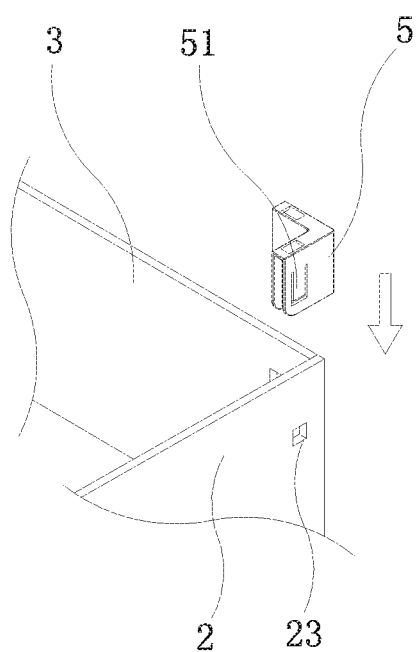
FIG. 4A is a schematic view of the present invention, illustrating that the first connecting member, the side board and the rear board in FIG. 4 are to be assembled.

Furthermore, as shown in FIG. 4A, the upper end of the junction of each side board 3 and the rear board 2 is insertedly engaged in a first connecting member 5. The first connecting member 5 is provided with two spaced, tilted elastic fasteners 51. Two side of the junction of each side board 3 and the rear board 2 are formed with fastener holes 23. The elastic fasteners 51 are in snap-fit with the corresponding fastener holes 23, respectively. As the upper end of the junction of each side board 3 and the rear board 2 is gradually inserted into the first connecting member 5, the elastic fasteners 51 will be lifted by the side board 3 and the rear board 2. When the elastic fasteners 51 are aligned with the fastener holes 23, the elastic fasteners 51 will be elastically restored to be in snap-fit with the fastener holes 23. The assembly of the present invention is faster and more convenient. The first connecting member 5 is formed with a bend. The elastic fasteners 51 are respectively formed on both sides of the bend of the first connecting member 5 to adapt to the bend angle of the junction of the side board 3 and the rear board 2.

Figure 1A:
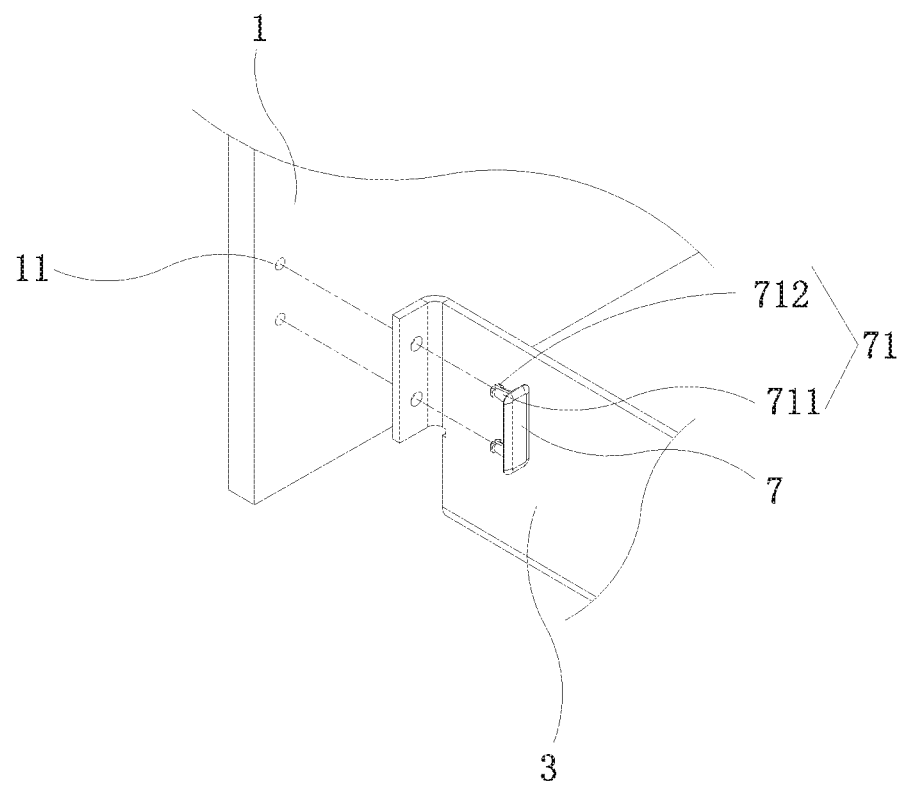
FIG. 1A is a schematic view of the present invention, illustrating that the second connecting member, the front board and the side board in FIG. 1 are to be assembled.
Figure 2:
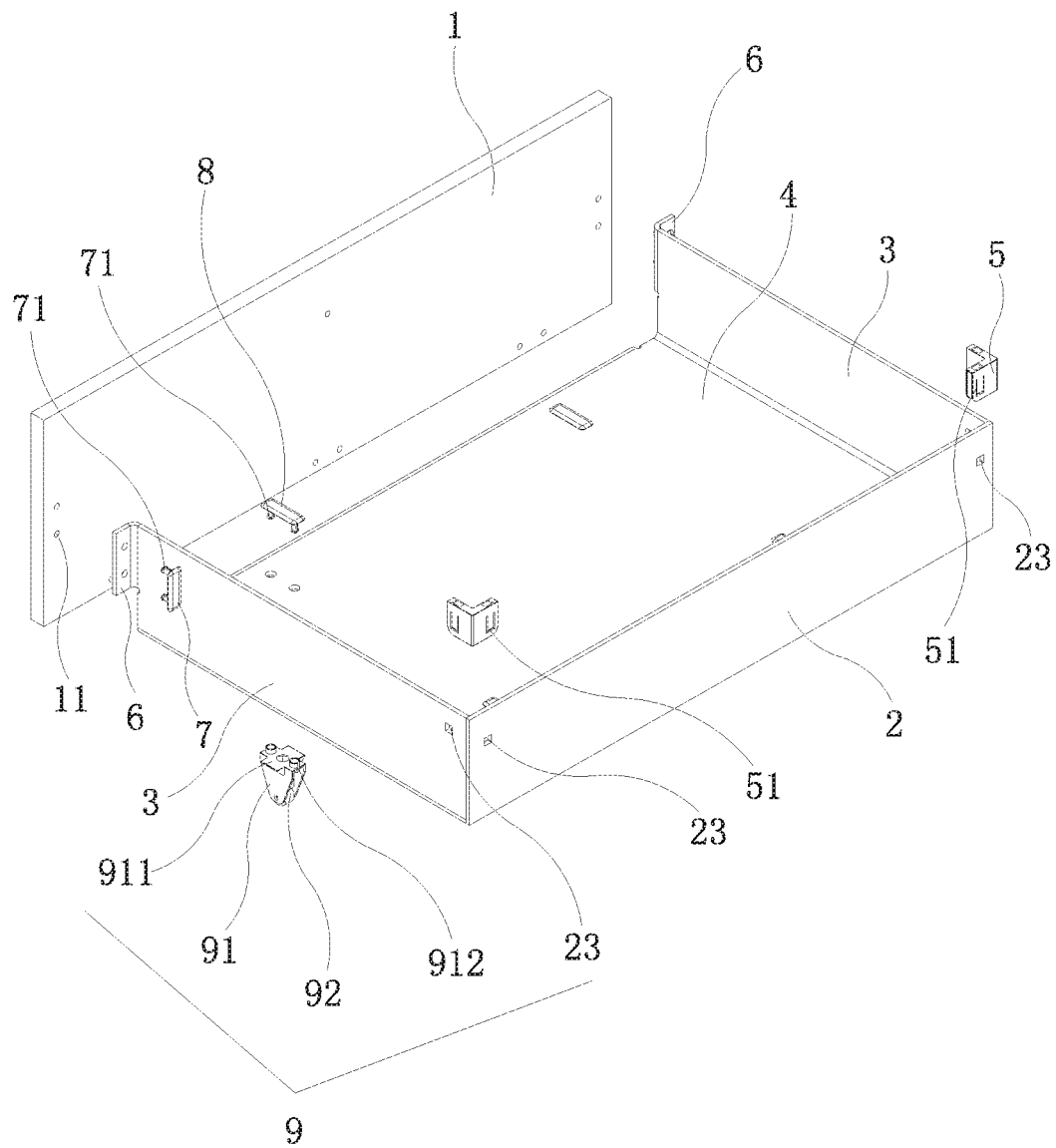
FIG. 2 is an exploded view of the present invention.
Figure 3:
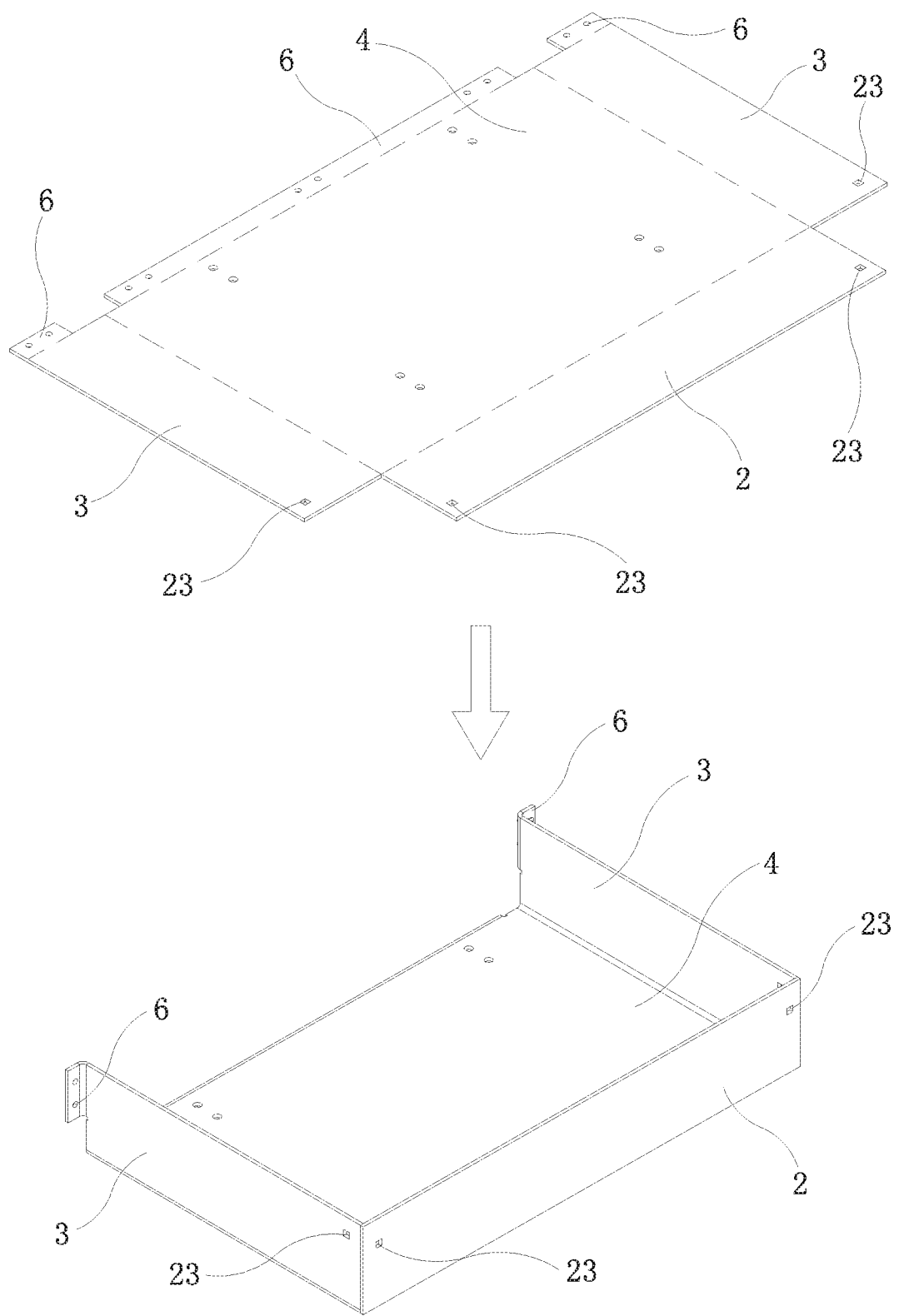
FIG. 3 is a first schematic view of the present invention to be assembled.

Further, in order to improve the overall connection strength of the present invention, the upper portion of one edge of each side board 3, connected to the front board 1, is formed with a bendable connecting segment 6. The front edge of the bottom board 4, connected to the front board 1, is formed with another bendable connecting segment 6. The connecting segments 6 are attached to the front board 1. A second connecting member 7 is detachably connected to each connecting segment 6. The elastic expansion member 71 is disposed on the second connecting member 7. The engaging hole 11 is disposed on the front board 1. The elastic expansion member 71 is inserted through each connecting segment 6 and the corresponding engaging hole 11 to be elastically expanded and in snap-fit with the corresponding engaging hole 11. When the front board 1, the side boards 3 and the bottom board 4 are to be assembled, the front board 1 is first aligned with the side boards 3 and the bottom board 4, as shown in FIG. 1A, and then the elastic expansion member 71 of the second connecting member 7 is inserted from one side of the connecting segment 6 to the other side and into the corresponding engaging hole 11. Then, the elastic expansion member 71 is elastically expanded to be in snap-fit with the corresponding engaging hole 11. The top of the second connecting member 7 is blocked by the connecting segment 6 and is located on one side of the connecting segment 6.

The elastic expansion member 71 may include two spaced elastic bodies 711. A stop 712 is protruded on the outer side wall of each elastic body 711. After the elastic bodies 711 pass through the corresponding engaging holes 11, the elastic bodies 711 elastically expand away from each other, and the stops 712 of the elastic bodies 711 are pressed against the inner walls of the engaging holes 11, thereby facilitating the assembly of the present invention.

In order to facilitate the movement of the present invention, casters 9 may be provided under the bottom board 4. The caster 9 is formed with fixing holes 912. A third connecting member 8 is detachably connected to the bottom board 4. The third connecting member 8 is provided with at least one elastic body assembly. The elastic body assembly includes two spaced elastic bodies 711. A stop 712 is protruded on the outer side wall of each elastic body 711. After the elastic bodies 711 pass through the corresponding fixing holes 912, the elastic bodies 711 elastically expand away from each other, and the stops 712 of the elastic bodies 711 are pressed against the outer walls of the fixing holes 912. The structure of the third connecting member 8 is the same as the structure of the second connecting member 7.

The number of the elastic body assemblies is two, but it is not limited to this. The elastic body assemblies are arranged at intervals to improve the connection firmness of the present invention. The number of the elastic expansion members 71 may be two, and they are arranged at intervals. The number of the fixing holes 912 is the same as the number of the elastic body assemblies. The number of the elastic expansion members 71 is the same as the number of the engaging holes 11.

In addition, in order to facilitate the overall pulling of the present invention, the number of the casters 9 is four, and the casters 9 are evenly spaced, but it is not limited to this. The number of the casters 9 may be one or three.

Figure 5:
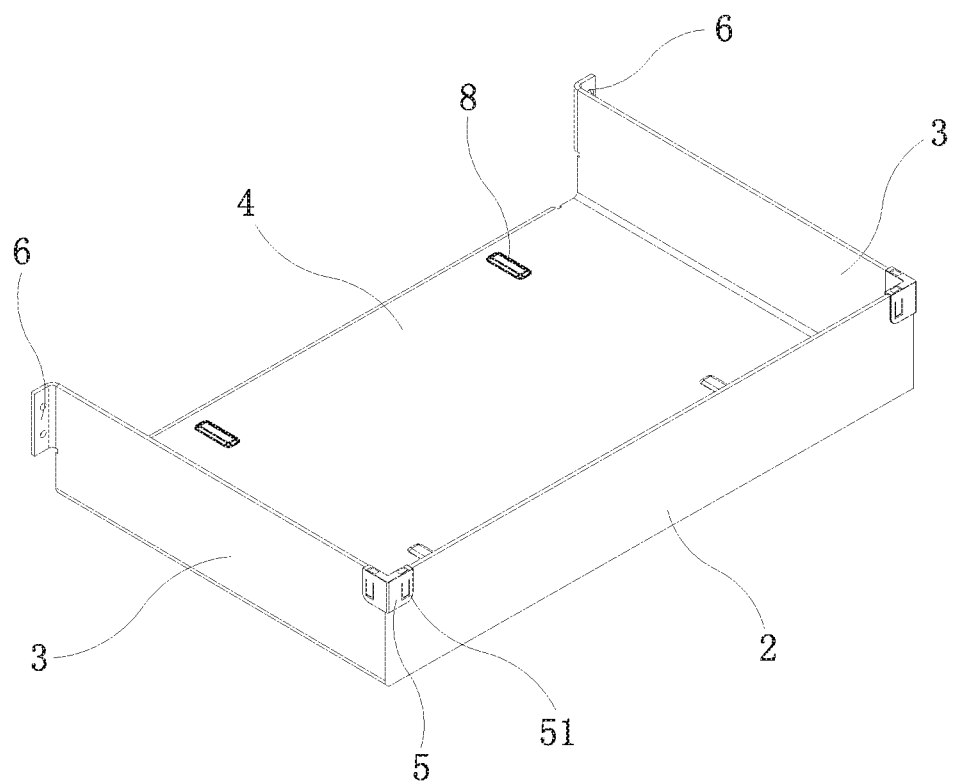
FIG. 5 is a third schematic view of the present invention to be assembled.
Figure 5A:
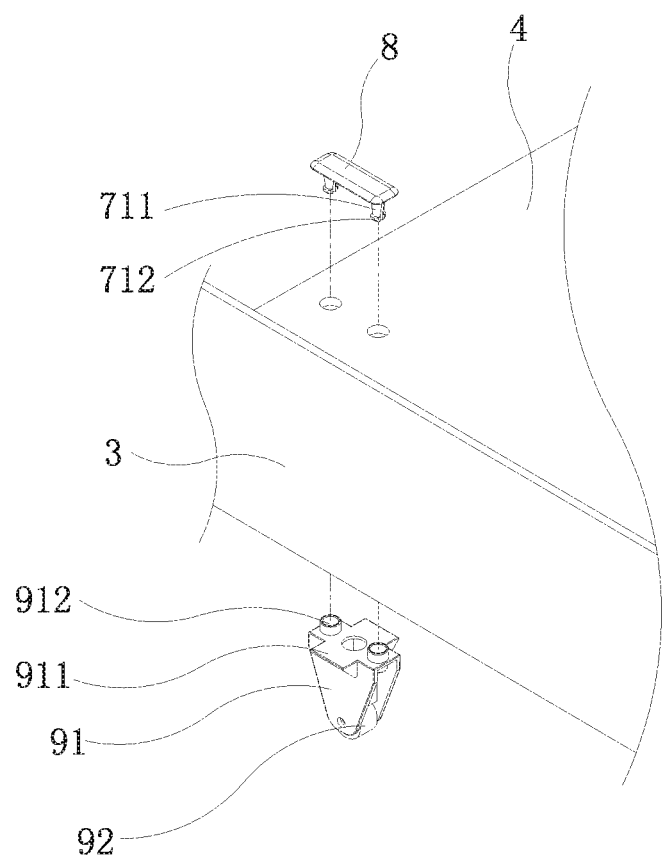
FIG. 5A is a schematic view of the present invention, illustrating that the third connecting member and the caster in FIG. 5 are to be assembled.

Further, as shown in FIG. 5A, the caster 9 may include a support frame 91 and a wheel 92. The wheel 92 is rotatably connected to the lower end of the support frame 91. The fixing holes 912 are spaced apart from each other and arranged on the top of the support frame 91. The opposite sides of the top of the support frame 91 extend outward to form swing-limiting support plates 911, respectively. The swing-limiting support plates 911 are located between the fixing holes 912. The swing-limiting support plates 911 are configured to prevent the caster 9 from swinging and skewing to the left and right sides during the pulling of the present invention, so that the caster 9 is not easily skewed.

In order to reduce the overall weight of the present invention and facilitate transportation, the front board 1, the rear board 2, the side boards 3 and the bottom board 4 may be hollow PP boards, but not limited thereto. The front board 1, the rear board 2, the side boards 3 and the bottom board 4 may be made of other foldable materials. The upper surface of the junction of the rear board 2 and the side board 3 remains connected, and the lower side of the junction of the rear board 2 and the side board 3 is in a disconnected state. The upper surface of the junction of the rear board 2 and the bottom board 4 remains connected, and the lower side of the junction of the rear board 2 and the bottom board 4 is in a disconnected state. This facilitates the bending and standing of the side boards 3 and the rear board 2 relative to the front board 1.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A screw-free drawer structure, comprising a front board, a rear board, two side boards, and a bottom board; the rear board, the side boards and the bottom board being integrally formed, the rear board being foldably connected to a rear edge of the bottom board, the side boards being foldably connected to opposite sides of the bottom board, the rear board being disposed between the two side boards;

an upper end of a junction of each said side board and the rear board being detachably connected through an elastic fastener that is in snap-fit with a fastener hole;

a junction of each said side board and the front board being detachably connected through an elastic expansion member that is elastically expanded to be in snap-fit with an engaging hole;

wherein casters are provided under the bottom board, each said caster is formed with fixing holes, a third connecting member is detachably connected to the bottom board, the third connecting member is provided with at least one elastic body assembly, the elastic body assembly includes two spaced elastic bodies, a stop is protruded on an outer side wall of each said elastic body, after the elastic bodies pass through the corresponding fixing holes, the elastic bodies elastically expand away from each other, and the stops of the elastic bodies are pressed against outer walls of the fixing holes.

2. The screw-free drawer structure as claimed in claim 1, wherein the upper end of the junction of each said side board and the rear board is insertedly engaged in a first connecting member, the first connecting member is provided with two spaced, tilted elastic fasteners, two sides of the junction of each said side board and the rear board are formed with fastener holes, and the elastic fasteners are in snap-fit with the fastener holes.

3. The screw-free drawer structure as claimed in claim 1, wherein a junction of the bottom board and the front board is detachably connected through another elastic expansion member that is elastically expanded to be in snap-fit with another engaging hole.

4. The screw-free drawer structure as claimed in claim 3, wherein an upper portion of one edge of each said side board, connected to the front board, is formed with a bendable connecting segment, a front edge of the bottom board, connected to the front board, is formed with another bendable connecting segment, each connecting segment is attached to the front board, each said connecting segment is detachably provided with a second connecting member, the elastic expansion member is disposed on the second connecting member, the engaging hole is disposed on the front board, the elastic expansion member is inserted through each said connecting segment and the engaging hole to be elastically expanded and in snap-fit with the engaging hole.

5. The screw-free drawer structure as claimed in claim 4,
wherein the elastic expansion member includes two spaced elastic bodies, a stop is protruded on an outer side wall of each said elastic body, after the elastic bodies pass through the engaging holes, the elastic bodies elastically expand away from each other, and the stops of the elastic bodies are pressed against inner walls of the engaging holes.

6. The screw-free drawer structure as claimed in claim 1, wherein the at least one elastic body assembly includes two elastic body assemblies.

7. The screw-free drawer structure as claimed in claim 6, wherein the number of the casters is four, and the casters are evenly spaced.

8. The screw-free drawer structure as claimed in claim 6, wherein each said caster includes a support frame and a wheel, the wheel is rotatably connected to a lower end of the support frame, the fixing holes are spaced apart from each other and arranged on a top of the support frame, opposite sides of the top of the support frame extend outward to form swing-limiting support plates, and the swing-limiting support plates are located between the fixing holes.

9. The screw-free drawer structure as claimed in claim 1, wherein the front board, the rear board, the side boards and the bottom board are hollow PP boards.

\* \* \* \* \*